United States Patent
Zanuccoli et al.

(10) Patent No.: US 6,404,272 B2
(45) Date of Patent: Jun. 11, 2002

(54) CHARGE PUMP BOOSTER DEVICE WITH TRANSFER AND RECOVERY OF THE CHARGE

(75) Inventors: Mauro Zanuccoli, Cesenatico; Roberto Canegallo, Tortona; Davide Dozza, Villanova, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/785,042

(22) Filed: Feb. 13, 2001

(30) Foreign Application Priority Data

Feb. 15, 2000 (EP) .............................. 00830105

(51) Int. Cl.[7] ................................ G05F 1/10
(52) U.S. Cl. ..................................... 327/536
(58) Field of Search ............................... 327/530, 534, 327/535, 536, 537

(56) References Cited

U.S. PATENT DOCUMENTS

| | | | |
|---|---|---|---|
| 5,140,182 A | * 8/1992 | Ichimura | 327/536 |
| 5,420,505 A | 5/1995 | Kondo | 324/158.1 |
| 5,777,317 A | 7/1998 | Maki | 250/208.1 |
| 5,969,988 A | 10/1999 | Tanzawa et al. | 365/185.23 |

OTHER PUBLICATIONS

Lauterbach, Christl et al., "Charge Sharing Concept for Power Efficiency and EME Improvement of Boosted Charge Pumps in NVMs," Siemens AG, Corporate Technology, Microelectronics.

* cited by examiner

Primary Examiner—Jeffrey Zweizig
(74) Attorney, Agent, or Firm—Lisa K. Jorgenson; E. Russell Tarleton; SEED IP Law Group PLLC

(57) ABSTRACT

The load pump booster device with transfer and recovery of the charge including a charge pump circuit with an output terminal connected to a load capacitor by means of a load node. In turn, the charge pump circuit includes a plurality of transfer transistors connected to one another in series, and define a plurality of transfer nodes. Each transfer node is connected to a storage capacitor. The booster device also includes a plurality of controlled switches interposed between the load node and a respective transfer node, in order to connect to the load node a single one of the transfer nodes. By this means, between the load capacitor and the storage capacitors there takes place a phase of transfer of charge followed by a phase of recovery of charge, from the storage capacitors to the load capacitor. FIG. 1.

18 Claims, 3 Drawing Sheets

CHARGE PUMP BOOSTER DEVICE WITH TRANSFER AND RECOVERY OF THE CHARGE

TECHNICAL FIELD

The present invention relates to a charge pump booster device with transfer and recovery of the charge.

BACKGROUND OF THE INVENTION

As is known, non-volatile memory devices with a single supply voltage use both negative and positive booster devices, which use charge pump circuits. The latter have the function of generating a boost voltage, which has a value greater than the supply voltage. The boost voltage is used to carry out operations of programming, reading and erasure of the memory devices.

In general, these booster devices have problems of consumption and occupation of a substantial surface area, in particular when the memory devices in which they are incorporated are used in applications which require reduced consumption, such as portable applications (digital cameras, MP3 readers, cellular telephony, smart cards), or consumer electronics applications.

Booster devices are known, which are used in low-power applications, and act at the level of the phase signals which are generated by the phase generator stage incorporated in them. In particular, these known booster devices save energy and charge the capacitors inside the booster device (boost capacitors) in two successive steps, in each of which the internal capacitors are charged to a voltage which is equivalent to half the supply voltage. In order to reduce further the energy necessary, a technique is used of sharing the charge between two parallel stages, which are controlled in push-pull form.

These known booster devices could be improved.

SUMMARY OF THE INVENTION

The technical problem on which the present invention is based consists of providing a booster device which makes it possible to save energy.

The technical problem is solved by a booster device that includes a charge pump circuit with an input terminal and an output terminal; a load capacitor with a load node that is connected to the output terminal; the charge pump circuit including a plurality of switches connected to one another in series between the input terminal and the output terminal of the charge pump circuit and defining between one another a plurality of circuit nodes; a plurality of storage capacitors with a first terminal connected to a respective circuit node and a second terminal that receives phase signals; and a circuit for switching off the pump that generates simultaneously opening signals for the switches and charge distribution/re-distribution control signals; and charge distribution/re-distribution circuit interposed between the load node and the first terminal of the storage capacitors and that is configured to receive the charge distribution/re-distribution control signals. Ideally, the charge distribution/re-distribution circuit includes a plurality of controlled switch elements interposed between the load node and the corresponding circuit node.

BRIEF DESCRIPTION OF THE DRAWINGS

The characteristics and advantages of the booster device according to the invention will become apparent from the following description of an embodiment provided by way of non-limiting example, with reference to the attached drawings, in which.

DETAILED DESCRIPTION OF THE INVENTION

Figure 1:
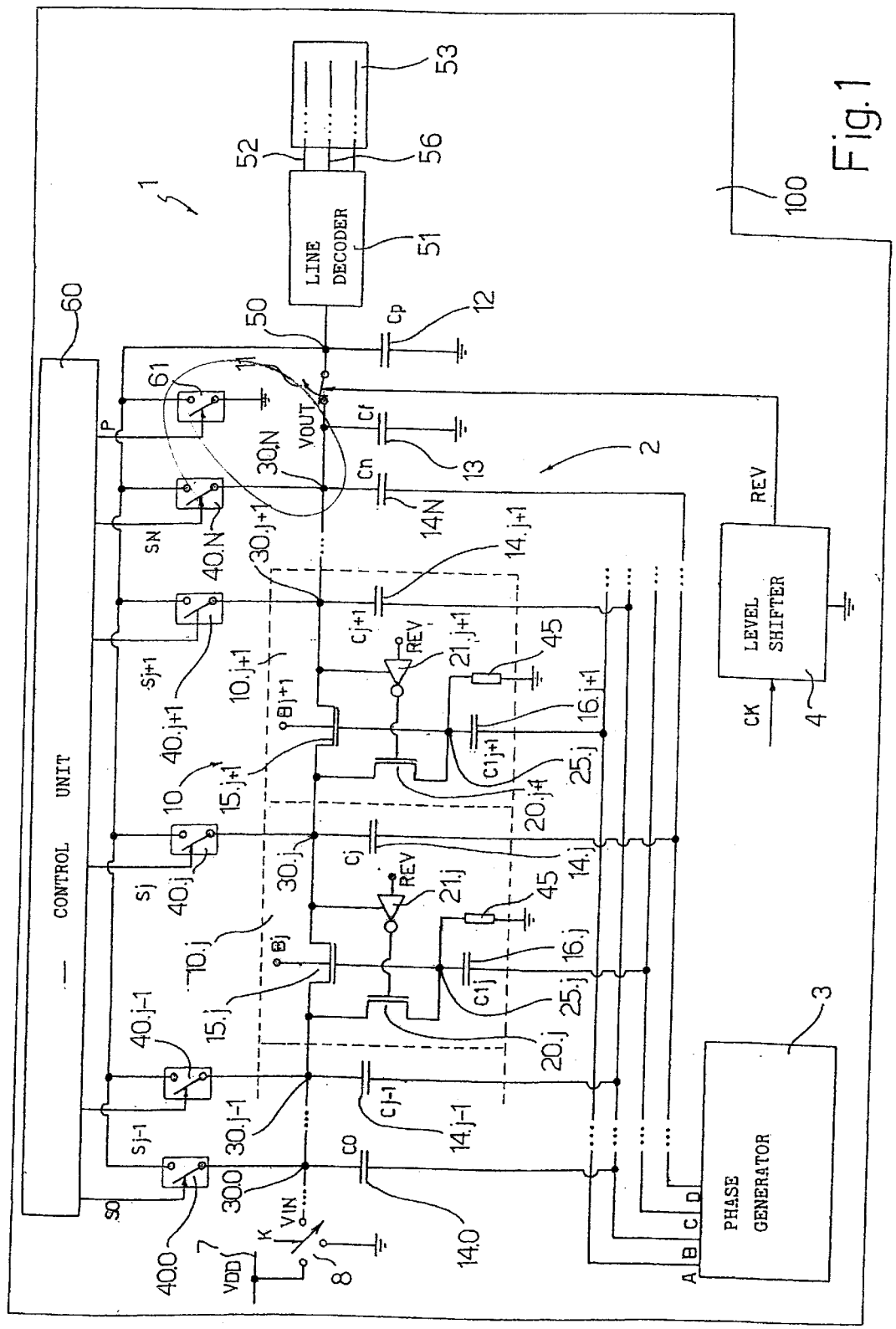
FIG. 1 shows a circuit diagram of a booster device according to the invention.

FIG. 1 shows a booster device 1, which is incorporated in a memory 100 of the flash-EEPROM type, and comprises a charge pump circuit 2, a phase generator 3, and a level shifter 4.

In detail, the charge pump circuit 2 has an input 30.0, at which there is present an input voltage $V_{IN}$, and a output 30.N, at which there is present an output voltage $V_{OUT}$. The input 30.0 of the charge pump circuit 2 is connected selectively to a supply line 7, which is set to a supply voltage $V_{DD}$ (for example 1.8 V–3.3 V), or to ground, by means of a selector 8, which is controlled by a control signal K. The charge pump circuit 2 consists of a plurality N of booster stages 10, which are arranged in cascade between the input 30.0 and the output 30.N of the charge pump circuit 2, and each receive two out of four phase signals A, B, C and D, which are supplied by the phase generator stage 3; in detail, the odd booster stages 10 receive the phase signals A, B, and the even booster stages 10 receive the phase signals C, D.

The phase generator stage 3 is a logic circuit of a generally known type, with four outputs that supply the phase signals A, B, C, D. The phase signals A, B, C, D are logic signals, which switch between $V_{DD}$ and 0V.

The level 4 shifter, which is of a known type and is not illustrated in detail, is connected between the output 30.N of the charge pump circuit 2 and the ground, and has a signal input, which receives the logic signal CK, and an output that supplies a high-voltage signal REV.

The output 30.N of the charge pump circuit 2 is connected to a load node 50 by means of a switch 11, which is controlled by the high-voltage signal REV. In turn, the load node 50 is connected by means of a line decoder 51 to a selected word line 52 of a memory cell array 53. A load capacitor 12, which has a capacitance $C_P$, has a first terminal connected to the load node 50, and a second terminal connected to ground. In particular, the load capacitor 12 represents the effective capacitive charge of the selected word line 52. Between the output 30.N of the charge pump circuit 2 and the ground, there is also connected a filter capacitor 13, which has a capacitance $C_f$. In particular, the capacitance $C_f$ has a high value, which is typically of two or three orders of magnitude greater than the capacitance $C_P$.

FIG. 1 shows in detail two booster stages of the charge pump circuit 2, indicated respectively as 10.j and 10.j+1, which are structurally the same as one another, but receive different phase signals, as previously indicated. For the sake of simplicity, only the booster device 10.j will be described, the components of which are identified by a reference number, and by the letter j; the booster stage 10.j+1 has identical components, which are identified by the same reference number and by j+1 after the point.

In detail, the booster stage 10.j comprises a storage capacitor 14.j, which has a capacitance $C_j$ with a value equivalent to approximately half the value of the capacitance $C_P$; a transfer transistor 15.j of the N-channel MOS type; a boost capacitor 16.j, which has a capacitance $C_{lj}$ with a value which is higher (at least one order of magnitude higher) than the capacitance $C_j$; and a pre-charging transistor 20.j which is also of the N-channel MOS type.

The storage capacitor 14.j has a first terminal which is connected to a transfer node $30_j$, and a second terminal which receives the phase signal D. The transfer transistor 15j is connected between the transfer node 30.j of the booster stage 10.j, and a transfer node 30j−1 of a booster stage 10.j−1, which is connected to the left of the booster stage 10.j, and has a gate terminal which is connected to a pre-charging node 25j. In addition, the transfer transistor 15.j is produced in triple-well form, and has a bulk terminal $B_j$ which is suitably polarized, in order to decrease the body effect. The boost capacitor 16j has a first terminal which is connected to the pre-charging node 25.j, and a second terminal which receives the phase signal C. The pre-charging transistor 20.j is connected between the transfer node 30.j−1 of the booster stage 10.j−1 and the pre-charging node 25.j, and has a gate terminal which is connected to the output of the inverter 21.j; in turn, the latter has a signal input which receives the high-voltage signal REV, and a supply input which is connected to the transfer node 30.j of the booster stage 10.j. Between the pre-charging node 25.j and the ground there is connected a discharge network 45 which is of a known type, and is not shown in detail.

As already stated, the booster stage 10j+1 has the same structure, and differs from the booster stage 10.j only in that the storage capacitor 14.j+1 receives the phase signal B, and the boost capacitor 16.j+1 receives the signal A. Similarly, the booster stage 10.j−1 (of which only the storage capacitor 14j−1 is shown) receives the signals A and B.

The booster device 1 also comprises a plurality of transfer switches 40.0, ..., 40.j, ..., 40.N, each of which is disposed between the load node 50 and a respective transfer node 30.1, ..., 30.j, ..., 30.N−1, as well as between the load node 50 and the input 30.0, and between the load node 50 and the output 30.N of the charge pump circuit 2. Each transfer switch 40.0, ..., 40.j, ..., 40.N is formed by means of a transistor of the NMOS type, and is controlled by a respective closure signal $S_O, ..., S_j, ..., S_N$. The closure signals $S_O, ..., S_j, S_N$ are generated by a control unit 60, such as to control closure of only one of the transfer switches 40.0, ..., 40.j, ..., 40.N at a time, and to keep all the others open.

The booster device 1 functions as follows.

During the phase of charging the selected word line 52, the charge pump circuit 2 is switched on, and the high-voltage signal REV is at a low level. Consequently, the switch 11 is closed, and the output voltage $V_{OUT}$ is present at the ends of the load capacitor 12. In addition, a conductive path is present between the node 30.j and the gate terminal of the pre-charging transistor 20.j, which is thus switched on. The transfer switches 40.0, 40.1, ..., 40.j, ..., 40.N are open, thus isolating the transfer nodes 30.1, ..., 30.j, ..., 30.N−1, the input 30.0 and the output 30.N from the load node 50.

Figure 2:
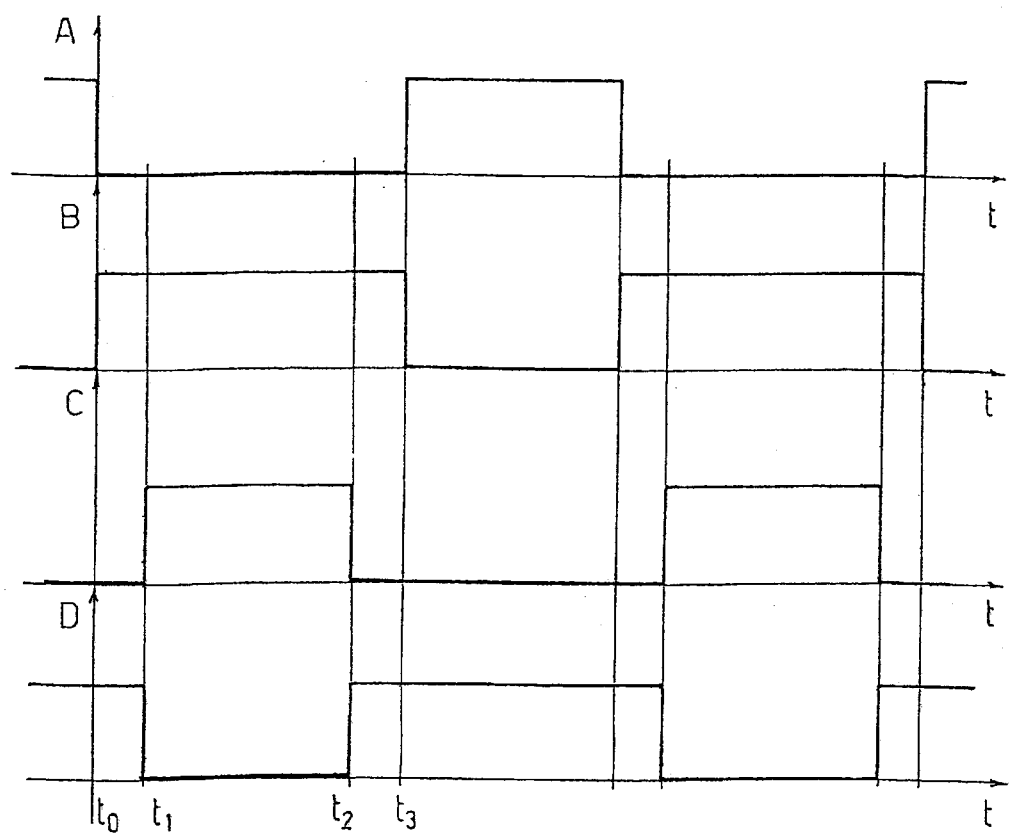
FIG. 2 shows the development of electrical values measured on the device in FIG. 1.

With reference to FIG. 2, consideration is given initially to the moment $t_O$, after the phase signal A has switched from high to low, the signal B has switched from low to high, and the signals C and D are low and high respectively.

In this condition, the transfer nodes 30.j−1 and 30.j have high voltage (at a value which depends on the number of booster stages 10 present upstream from the booster stages illustrated), and the pre-charging node 25.j is discharged, as explained hereinafter; consequently the pre-charging transistor 20.j of the booster stage 10.j is switched on, and permits pre-charging of the pre-charging node 25.j (and thus of the boost capacitor 16.j), to the voltage which is present on the transfer node 30.j−1 of the booster stage 10.j−1. In addition, the transfer transistor 15.j is switched off.

As soon as the phase signals C and D switch to the high and low states respectively (moment $t_1$), the pre-charging transistor 20.j switches off, and allows the pre-charging node 25.j to go to a high voltage, which is equivalent to the sum of the voltage previously reached plus the voltage which corresponds to the high logic value of the phase signal C (supply voltage $V_{DD}$). Consequently, the transfer transistor 15.j switches on, and permits transfer of a charging package from the transfer node 30.j−1 of the booster stage 10.j−1, to the transfer node 30.j of the booster stage 10.j.

At the moment $t_2$, the phase signals C and D switch respectively to the low and high states once more, and the transfer node 30.j is boosted, whereas the voltage of the pre-charging node 25.j decreases; consequently, the pre-charging transistor 20.j switches on once more, and permits discharge of the gate terminal of the transfer transistor 15.j towards the transfer node 30.j−1 of the booster stage 10.j−1, and switching off of the transfer transistor 15 .j itself.

In this stage, the pre-charging transistor 20.j+1 of the booster stage 10.j+1 is also switched on, and permits pre-charging of the node 25.j+1 (and thus of the boost capacitor 16.j+1), similarly to the procedure previously described for the booster stage 10.j of the phase contained between the moments $t_0$ and $t_1$.

At the moment $t_3$, the phase signals A and B switch respectively to the high state and the low state. The pre-charging transistor 20.j is switched on, and maintains the pre-charging condition of the pre-charging node 25.j; the transfer transistor 15.j continues to be switched off. Simultaneously, the transfer transistor 15.j+1 is switched on, and permits transfer of a charge package from the storage capacitor 14.j of the booster stage 10.j, to the charge storage capacitor 14.j+1 of the booster stage 10.j+1.

By this means, there is a gradual transition of charges from the input 30.0 to the output 30.N of the charge pump circuit 2 (FIG. 1).

On completion of the charging phase of the selected word line 52, the output voltage $V_{OUT}$ which is present at the ends of the load capacitor 12 is equivalent to $(N+1)^* V_{DD}$; in addition, at the ends of each storage capacitor 14.0, ..., 14.j, ..., 14.N, there is present an intermediate voltage $V_0, ..., V_j, ..., V_N$, which has a value between the supply voltage $V_{DD}$ and the output voltage $V_{OUT}$; in particular, $V_{DD} < V_0, ..., < V_j ..., < V_N < V_{OUT}$.

In this condition, it is possible to carry out the required operations on the memory cells (not shown) which are connected to the selected word line 52 (for example, reading, writing or erasure). On completion, it is necessary to discharge the selected word line 52; according to one aspect of the invention, this takes place by transferring the charge stored from the load capacitor 12 towards the storage capacitors 14.0, ..., 14.j, ..., 14.N, which are used as charge storage capacitors.

In order to act as true charge storage capacitors, the storage capacitors 14.0, ..., 14.j, ..., 14.N must be electrically isolated from one another. For this purpose, the charge pump circuit 2 is switched off, and the phase generator stage 3 is disabled by the control unit 60. The charge pump circuit 2 is switched off as follows: the level shifter 4 generates the high voltage signal REV at a high level, giving rise to switching off of the pre-charging transistors 20.0, ..., 20.j, ..., 20.N, whereas the transfer transistors 15.0, ...

., 15.j, ..., 15.N are switched off by discharging their gate terminals to ground via the discharge circuit 45. In addition, the high-level signal REV gives rise to opening of the switch 11, with consequent disconnection of the filter capacitor 13 from the load capacitor 12.

The charge transfer phase consists of N charge distribution phases between the load capacitor 12 and the storage capacitors 14.0, ..., 14.j, ..., 14.N. These N charge distribution phases do not overlap temporally, and are carried out in sequence from the storage capacitor 14.N, until the storage capacitor 14.0 is reached.

Figure 3:
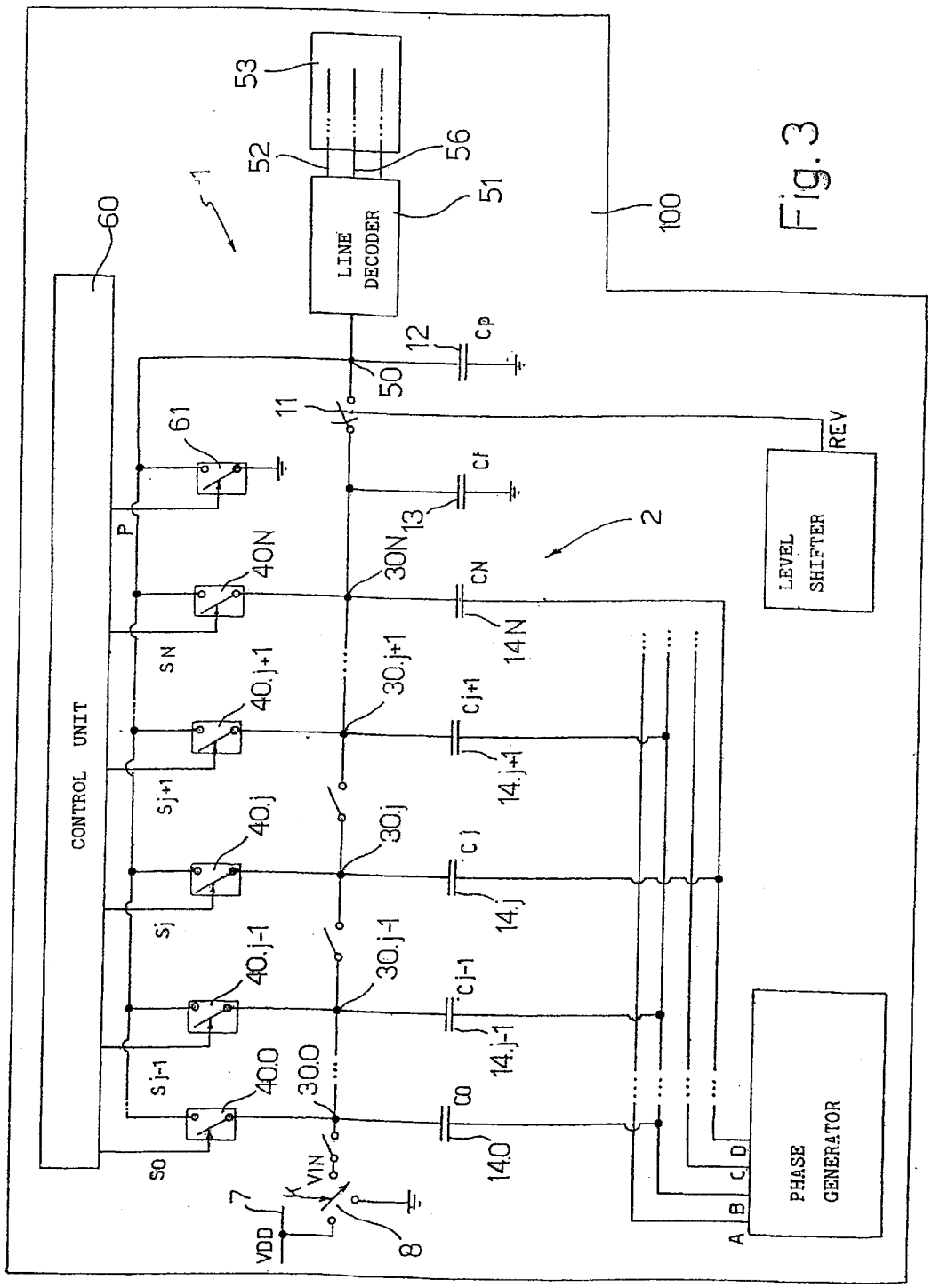
FIG. 3 shows the circuit diagram of the booster device in FIG. 1, in a different operating condition.

With reference to FIG. 3, each load distribution phase involves closure of only one of the transfer switches 40.0, ..., 40.j, ..., 40.N, starting from the transfer switch 40.N, and all the others are kept open. By this means, only one of the storage capacitors 14.0, ..., 14.j, ..., 14.N, starting from the storage capacitor 14.N, is connected directly to the load capacitor 12.

In greater detail, at the start of the charge transfer phase, there is a first charge distribution phase in which the transfer switch 40.N is closed, controlled by the closure signal $S_N$, and the storage capacitor 14.N is connected directly to the load capacitor 12. This permits a transfer of charge from the load capacitor 12 to the storage capacitor 14.N, with a consequent decrease and increase, respectively, in the output voltage $V_{OUT}$ and the intermediate voltage $V_N$. The transfer of charge between the two capacitors 12 and 14.N continues until equilibrium is reached between the two voltages applied. At this point, this first charge distribution phase ends, and the transfer switch 40.N is opened, thus isolating the storage capacitor 14.N from the load capacitor 12.

The procedure described takes place for all the N charge distribution phases, and for each charge distribution phase, the voltage which is present at the ends of the capacitor 12 decreases, whereas the intermediate voltage which is present at the ends of the selected storage capacitor 14.0, ..., 14.j, ..., 14.N increases. Consequently, on completion of the charge transfer phase, at the load capacitor 12 there is present a first value $V_{1OUT}$ of the output voltage $V_{OUT}$, which is lower than the intermediate voltages $V_{1O}, \ldots, V_{1j}, \ldots, V_{1N}$ which are present at the ends of the storage capacitors 14.0, ..., 14.j, ..., 14.N; in particular, $V_{1OUT} \leq V_{1O}, \ldots, \leq V_{1j}, \ldots, \leq V_{1N}$. The voltage $V_{1OUT}$ can be left unchanged, or it can be further reduced, by discharging the load capacitor 12 to ground via a corresponding discharge switch 61, which is controlled by a discharge signal P generated by the control unit 60.

From the foregoing description, it will be appreciated that the energy produced by the charge pump circuit 2 during the phase of charging the selected word line 52, is almost completely transferred into the storage capacitors 14.0, ..., 14.j, ..., 14.N. However, not all the energy produced by the charge pump circuit 2 can be transferred into the storage capacitors 14.0, ..., 14.j, ..., 14.N, since each charge distribution phase involves an inevitable loss of energy.

On completion of the discharge phase of the selected word line 25, selection takes place, by means of the line decoder 51, of a new word line 26, the charging phase of which takes place partially via a charge recovery phase, from the storage capacitors 14.0, ..., 14.j, ..., 14.N, to the load capacitor 12. In particular, the charge recovery phase consists of N phases of re-distribution of charge between the storage capacitors 14.0, ..., 14.j, ..., 14.N and the load capacitor 12. These N charge re-distribution phases do not overlap temporally, and are carried out in sequence from the storage capacitor 14.0, until the storage capacitor 14.N is reached.

Again with reference to FIG. 3, each charge re-distribution phase involves closure of a single one of the transfer switches 40.0, ..., 40.j, ..., 40.N, starting from the transfer switch 14.0, and all the others are kept open. By this means, a single one of the storage capacitors 14.0, ..., 14.j, ..., 14.N, starting from the storage capacitor 14.0, is connected directly to the load capacitor 12. In greater detail, at the start of the charge recovery phase, there is a first charge re-distribution phase, in which the transfer switch 40.0 is closed, controlled by the closure signal $S_O$, and the storage capacitor 14.0 is connected directly to the load capacitor 12. This permits the transfer of charge from the storage capacitor 14.0 to the load capacitor 12, with consequent decrease and increase, respectively, in the intermediate voltage $V_{1O}$ and the voltage $V_{1OUT}$ present at the ends of the load capacitor 12, on completion of the phase of discharge of the selected word line 52. The transfer of charge between the two capacitors 14.0 and 12 continues until equilibrium is reached between the voltages applied. At this point, the charge re-distribution phase ends, and the transfer switch 40 is opened, thus isolating the storage capacitor 14 from the load capacitor 12. The procedure described takes place for all the N charge re-distribution phases; in particular, at each charge distribution phase, the voltage which is present at the ends of the capacitor 12 increases, whereas the intermediate voltage which is present at the ends of the selected storage capacitor 14.0, ..., 14.j, ..., 14.N decreases. Consequently, on completion of the charge transfer phase, at the load capacitor 12 there is present a second value $V_{2OUT}$ of the output voltage $V_{OUT}$, which is higher than the intermediate voltages $V_{20}, \ldots, V_{2j}, \ldots, V_{2N}$ which are present at the ends of the storage capacitors 14.0, ..., 14.j, ..., 14.N; in particular, $V_{2O} \leq \ldots, \leq V_{2j}, \ldots, \leq V_{2N} \leq V_{2OUT}$. Since each charge re-distribution phase involves a loss of energy, the value of the voltage $V_{2OUT}$ is lower than the value of the output voltage $V_{OUT}$; in particular, the value of the voltage $V_{2OUT}$ is between the value of the output voltage $V_{OUT}$ and the value of the supply voltage $V_{DD}$. Consequently, the charge pump circuit 2 must be switched on once more in order to be able to complete charging the word line 56 which is currently selected. However, compared with the known booster devices, there is substantial recovery of load, and consequently substantial savings in terms of energy produced by the charge pump circuit 2. In fact, the voltage $V_{2OUT}$ is not equivalent to 0V, as is the case for the known booster devices, but it has a high value, close to the output voltage $V_{OUT}$. The The filter capacitor 13, at which there is still present a voltage $V_F$ which is equivalent to the output voltage $V_{OUT}$, can be reconnected to the load capacitor 12, by means of closure of the switch 11, or on completion of the charge transfer phase, or on completion of the charge recovery phase. In both cases however, a further charge re-distribution phase is included between the filter capacitor 13 and the load capacitor 12, such as to discharge/charge the load capacitor 12 better, according to whether the filter capacitor 13 is re-connected to the load capacitor 12 at the end of the charge transfer phase or at the end of the charge recovery phase.

The advantages obtained by means of the booster device 1 described above are as follows: Firstly, as previously stated, use of the booster device 1 permits substantial recovery of the charge produced by the charge pump circuit 2, and thus achieves substantial energy savings (up to approximately 30–40% compared with the known booster devices). This energy savings increases as the number N of booster stages 10 present inside the charge pump circuit 2 is increased. In fact, when N increases, the difference between the voltage values present in two successive stages after the charge re-distribution decreases, and consequently, the energy dissipated during each charge re-distribution phase decreases.

Furthermore, the booster device 1 has high performance levels in terms of charge recovery when the supply voltage $V_{DD}$ decreases (which is compatible with the present trend to use increasingly lower supply voltages) since, for the same output voltage $V_{OUT}$ required, the number N of booster stages 10 must be increased, and thus, as already explained, the energy dissipated during each charge re-distribution phase decreases.

In addition, the booster device 1 involves a limited increase in surface area, which is negligible in relation to its total surface area. Moreover, as previously described, use of the booster device 1 makes it possible to increase performance, in terms of energy consumption, of the memory device 100 in which it is incorporated, leaving both the memory cell array 53 and the line decoder 51 unaltered.

Finally, it is apparent that many changes and variants can be made to the booster device described and illustrated, all of which come within the scope of the inventive concept, as defined in the attached claims. In particular, the structure of the charge pump circuit 2 can be varied in comparison with the description provided; for example, the transfer transistors 15 can be replaced by diodes. In addition, the present booster device can also be applied to different devices, such as voltage regulators, DC/DC feeders, low-consumption portable equipment and measuring equipment.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

What is claimed is:

1. Charge pump booster device comprising:
    a charge pump circuit with an input terminal and an output terminal; and
    a load capacitor with a load node that is connected to the output terminal;
    the charge pump circuit (2) comprising:
    a plurality of switch means connected to one another in series between the input terminal and the output terminal of the charge pump circuit, and defining between one another a plurality of circuit nodes;
    a plurality of storage capacitors, with a first terminal connected to a respective circuit node and a second terminal that receives phase signals;
    means for switching off the pump that generate simultaneously opening signals for the switch means and charge distribution/re-distribution control signals; and
    charge distribution/re-distribution means interposed between the load node and the first terminal of the storage capacitors and receive the charge distribution/re-distribution control signals.

2. The device of claim 1, wherein the charge distribution/re-distribution means comprise a plurality of controlled switch elements interposed between the load node and a corresponding circuit node.

3. The device of claim 2, wherein the means for switching off the pump comprise control means that control sequentially closure of a single one at a time of the controlled switch elements.

4. The device of claim 3, wherein the controlled switch elements each comprise a control terminal that receives a corresponding charge distribution/re-distribution control signal; the charge distribution/re-distribution control signal switchable between a first closure value of a corresponding controlled switch element, and a second opening value of the corresponding controlled switch element.

5. The device of claim 1, wherein the switch means comprise a control terminal; and wherein the means for switching off the pump comprise:
    a plurality of transistor elements interposed between a corresponding circuit node and a corresponding control terminal for the switch means; and
    a plurality of driving means that receive the opening signals.

6. The device of claim 5, wherein the driving means each comprise an inverter that has a signal input that receives an opening signal, a supply input connected to a corresponding circuit node and an output connected to a control terminal of a corresponding transistor element.

7. The device of claim 5, wherein the means for switching off the pump additionally comprise discharge means, connected between the control terminals of the said switch means and a reference potential line.

8. A method for saving energy in a charge pump booster device, having a charge pump circuit with an input terminal and an output terminal, and a load capacitor with a load node which is connected to the said output terminal; the said charge pump circuit including a plurality of switch means connected to one another in series between the said input terminal and the said output terminal of the said charge pump circuit, and defining between one another a plurality of circuit nodes; and a plurality of storage capacitors, with a first terminal connected to a respective circuit node and a second terminal which receives phase signals; the method comprising:
    switching off the charge pump; and
    controlling charge distribution/re-distribution between the load capacitor and the storage capacitors.

9. The method of claim 8, wherein controlling charge distribution/re-distribution comprises:
    closing a plurality of controlled switch elements interposed between the load node and a corresponding circuit node.

10. The method of claim 9, comprising controlling sequentially the closure of a single one at a time of the controlled switch elements.

11. The method of claim 9, comprising:
    isolating the circuit nodes from the output terminal; and
    closing a single one at a time of the controlled switch elements, and transferring a first quantity of charge from the load capacitor to one of the storage capacitors connected to the single one of the controlled switch elements; and
    repeating the phase of closure, in sequence, starting from the output terminal towards the input terminal of the charge pump circuit.

12. The method of claim 1, comprising, in succession:
    closing a single one at a time of the controlled switch elements, and transferring to the load capacitor a second quantity of charge from one of the storage capacitors connected to the single one of the controlled switch elements; and
    repeating the phase of closure, in sequence, starting from the input terminal towards the output terminal of the charge pump circuit.

13. A charge control circuit for a voltage booster having a charge pump circuit with an input terminal and with an output terminal coupled to a load node, the charge pump circuit having a plurality of switches coupled to one another in series between the input terminal and the output of the charge pump circuit and defining a plurality of circuit nodes between them, the charge pump circuit further having a plurality of storage capacitors, each storage capacitor having a first terminal coupled to a respective node, and a second terminal that receives phase signals, the charge control circuit comprising:

a charge transfer and recovery circuit coupled to the plurality of switches, the load node, and the first terminal of each of the storage capacitors, the charge transfer and recovery circuit configured to switch off the charge pump circuit and to distribute charges from the load node to the storage capacitors and from the storage capacitors to the load node.

14. The circuit of claim 13, wherein the charge transfer and recovery circuit comprises a plurality of switch elements coupled to a control unit and configured to distribute the charges between the load node and the storage capacitors.

15. The circuit of claim 14, wherein the control unit is configured to control each switch element sequentially.

16. The circuit of claim 14, wherein the charge transfer and recovery circuit is configured to generate switching-off signals to switch off the charge pump circuit.

17. The circuit of claim 16, wherein the charge transfer and recovery circuit comprises a plurality of transistor elements, each transistor element coupled between a corresponding circuit node and a corresponding control terminal for each switch element, and a plurality of inverters, each having an output coupled to a control terminal of a respective transistor element, an input coupled to the control unit for receiving a corresponding switching-off signal, and a supply input coupled to a corresponding circuit node.

18. The circuit of claim 17, wherein the charge transfer and recovery circuit comprises a discharge network coupled to each control terminal of each of the plurality of switches in the charge pump circuit.

* * * * *